United States Patent [19]

Wagener et al.

[11] Patent Number: 4,672,052

[45] Date of Patent: Jun. 9, 1987

[54] CATALYST FOR REMOVAL OF NITROGEN OXIDES FROM EXHAUST GASES

[75] Inventors: Dietrich Wagener, Essen; Karl H. Laue, Hattingen; Egmar Wunderlich, Mülheim; Theo Sander, Essen; Claus Flockenhaus, Essen; Erich Hackler, Essen; Blagoje Levkov, Wiesbaden; Daniel Grimm, Schlangenbad-Bärstadt; Hartmut Kainer, Wiesbaden; Hermann Stein, Taunusstein, all of Fed. Rep. of Germany

[73] Assignees: Didier-Werke AG, Wiesbaden; Didier Engineering GmbH, Essen, both of Fed. Rep. of Germany

[21] Appl. No.: 768,508

[22] Filed: Aug. 22, 1985

[30] Foreign Application Priority Data

Aug. 22, 1984 [DE] Fed. Rep. of Germany ....... 3430886

[51] Int. Cl.$^4$ .............................................. B01J 35/04
[52] U.S. Cl. ..................................... 502/439; 502/527; 423/239
[58] Field of Search .............................. 502/439, 527; 423/239 A

[56] References Cited

U.S. PATENT DOCUMENTS

| 4,044,102 | 8/1977 | Muraki et al. | 423/244 A |
| 4,049,777 | 9/1977 | Divivier et al. | 423/239 |
| 4,131,643 | 12/1978 | Utsunomiya et al. | 423/239 A |
| 4,154,803 | 5/1979 | Uchikawa et al. | 423/239 A |
| 4,235,604 | 11/1980 | Wagener et al. | 48/197 |
| 4,259,312 | 3/1981 | Flockenhaus et al. | 423/659 |
| 4,282,115 | 8/1981 | Atsukawa et al. | 502/218 |
| 4,448,895 | 5/1984 | Ono et al. | 502/304 |
| 4,503,162 | 3/1985 | Windawi et al. | 502/174 |

FOREIGN PATENT DOCUMENTS

| 3046921 | 9/1981 | Fed. Rep. of Germany . | |
| 1135247 | 12/1968 | United Kingdom | 502/527 |

*Primary Examiner*—W. J. Shine
*Attorney, Agent, or Firm*—Nils H. Ljungman

[57] ABSTRACT

A catalyst for use in a process for the removal of nitrogen oxides from exhaust gases contaminated with dust in which the process uses ammonia. The catalyst is made of a material which is easily disposable. Furthermore, the catalyst should be completely used up in the catalysis. The catalyst comprises individual ceramic bricks with a porous surface, and passages therethrough for the flow of the exhaust gases. The bricks exhibit a resistance to abrasion which is designed so that the dust of the exhaust gas which flows through the passages erodes the catalyst surface, thereby reactivating the catalyst. The exhaust gas carries the dust and the eroded material along with it.

19 Claims, 5 Drawing Figures

CATALYST FOR REMOVAL OF NITROGEN OXIDES FROM EXHAUST GASES

CROSS-REFERENCE TO CO-PENDING APPLICATIONS

Co-pending application Ser. No. 768,417 (Attorney Docket No. NHL-DWA-08) filed on Aug. 22, 1985, entitled "Method And Apparatus For The Reactivation Of A Catalyst", and co-pending application Ser. No. 768418 (Attorney Docket No. NHL-DWA-09) filed on Aug. 22, 1985, entitled "Process For Cleaning Of An Exhaust Gas", are both assigned to at least one of the same assignee as the instant application.

BACKGROUND OF THE INVENTION

1. Field of the Invention

The invention relates to catalysts, and more particularly, to catalysts for the removal of nitrogen oxides from exhaust gases of combustion which are contaminated with dust.

2. Description of the Prior Art

Nitrogen oxides contained in exhaust gases from combustion equipment can be converted, by catalytic reduction using ammonia, into harmless nitrogen and water. For this purpose, the exhaust gases are customarily conducted over bulk catalysts with the simultaneous introduction of gaseous ammonia, liquid ammonia or ammonia dissolved in water.

If the exhaust gases contain large quantities of dust or soot, then the bulk catalyst used quickly becomes stopped up. If the exhaust gases also contain catalyst poisons, such as sulfur or chlorine compounds, then these substances deactivate the catalytically-active surfaces. This is especially true if catalysts are used which are sensitive to catalyst poisons.

Active catalyst substances and carriers which withstand the various catalyst poisons are expensive, and furthermore, such substances are difficult to dispose of because of their heavy metal content. Catalyst material which is easily disposed of, for example, in a blast furnace, that is, iron oxides, such as $Fe_2O_3$, have tendencies toward the above-mentioned catalyst poisoning.

Overall, therefore, dust and catalyst poisons cause the active surface regions of the catalyst to become blocked up quickly, so that the activity of the catalyst is reduced, although there is still active catalyst material below the deactivated surface layer of the catalyst.

Some examples of catalytic technology are found in U.S. Pat. No. 4,259,312, entitled "Process And Apparatus For Catalytically Reacting A Reducing Gas And Water Vapor"; U.S. Pat. No. 4,235,604, entitled "Method For Processing Coke Oven Gas"; and U.S. Pat. No. 4,049,777, entitled "Method Of Waste Gas Treatment", all of which are assigned to at least one of the same assignees as the instant application.

Further examples of catalytic technology are found in U.S. Pat. No. 4,448,895, entitled "Process For Preparation Of Catalyst For Cleaning Exhaust Gases And Catalyst Prepared For The Process", and U.S. Pat. No. 4,503,162, entitled "Catalyst Systems For The Conversion Of Gases". All of the above-cited patents are incorporated herein by reference.

OBJECTS OF THE INVENTION

The object of the invention is to propose a catalyst which comprises an easily disposable material.

A further object of the invention is to provide a catalyst in which the volume of catalyst material is almost completely used up during use.

SUMMARY OF THE INVENTION

The invention achieves this object with a catalyst of the type described above, in that the catalyst comprises individual ceramic bricks with porous surfaces and with passages for permitting a flow of exhaust gas therethrough. The bricks have some resistance to abrasion. The bricks are designed so that the dust of the exhaust gas flowing through the passages erodes the catalyst surface, whereby the dust takes the eroded material along with it.

In this manner, the active surface is continuously renewed. The catalyst thus has a life at a continuous or a constant high activity, which can be determined in advance. An easily disposable material can be used for the catalyst, the erosion from which can be disposed of together with the dust.

One embodiment of the invention resides in a catalytic ceramic structure of at least one brick for use with ammonia for removal of oxides of nitrogen from an exhaust gas of combustion having dust contained therein, the ceramic material having at least one porous surface for being impinged by the exhaust gas; the ceramic material being formulated from predetermined components selected with regard to the dust content of the exhaust gas, to provide the ceramic material with a predetermined resistance to abrasion of dust entrained in the exhaust gas to reactivate catalytic action of the ceramic material at a predetermined rate of abrasion related to the predetermined resistance to abrasion of the ceramic material, whereby the abrasion proceeds at a predetermined rate in use, and further whereby material abraded from the ceramic material is carried away by exhaust gas.

In a preferred embodiment of the invention, there are penetration openings transverse to the flow direction in the passageways. Between the individual bricks there is a pressure equalization, whereby large dust particles are diverted from a flow direction straight along the passages. The dust particles therefore strike the active catalyst surfaces at an angle, specifically at an angle preferably between about 10° and about 30°. This action improves the cleaning action.

Preferably, the bricks are between 10 centimeters (cm) and 50 cm long. As a result of the shortness of the bricks, the oblique striking action of the dust particles is improved.

BRIEF DESCRIPTION OF THE DRAWINGS

Preferred embodiments of the invention are illustrated are illustrated in the accompanying drawings, in which.

DESCRIPTION OF THE PREFERRED EMBODIMENTS

Figure 1:
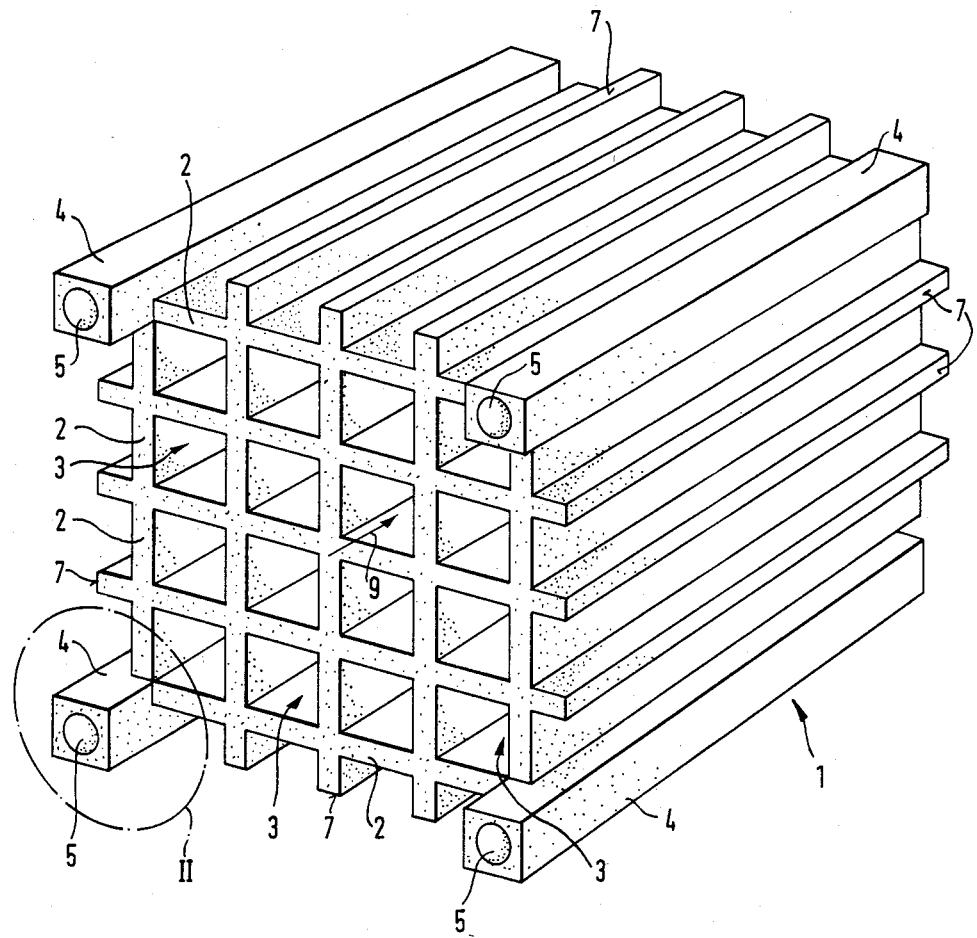
FIG. 1 shows a perspective view of a catalyst brick.

The bricks are produced from an initial substance with approximately the following composition:

TABLE A

| | |
|---|---|
| 88.7% of $Fe_2O_3$ | Iron Oxide |
| 3.2% of $Fe_3O_4$ | Iron Oxide |
| 0.11% of MnO | Manganese Oxide |
| 0.02% of CaO | Calcium Oxide |
| 4.5% of $SiO_2$ | Silicon Dioxide |
| 1.17% of $Al_2O_3$ | Aluminum Oxide |
| 0.01% of MgO | Magnesium Oxide |
| 0.04% of $TiO_2$ | Titanium Dioxide |
| 0.007% of $V_2O_5$ | Vanadium Oxide |
| 0.16% of $P_2O_5$ | Phosphorus Oxide |
| and traces of | |
| As | Arsenic |
| Pb | Lead |
| Cu | Copper |
| Cr | Chromium |

This substance gives the following reduction rate in percentages for stoichiometric ratios of the nitrogen oxide and ammonia at the following temperatures:

| Temperature | Reduction Rate |
|---|---|
| 300° C. | 93% |
| 360° C. | 97% |
| 390° C. | 94% |
| 400° C. | 95% | whereby the reduction rate is computed from the difference in the input and output oxides of nitrogen content, in relation to the oxides of nitrogen content on the input side.

It has been a surprising discovery that this substance, as described in Table A, which is in itself a mixture of ordinary catalyst substances, causes a substantial acceleration of the reaction of oxides of nitrogen.

A second substance with approximately the following composition was used to produce the bricks:

TABLE B

| | |
|---|---|
| 46% of $Cr_2O_3$ | Chromium Oxide |
| 28% of $Fe_2O_3$ | Iron Oxide |
| 15% of $Al_2O_3$ | Aluminum Oxide |
| 10% of MgO | Magnesium Oxide |
| 1% of $SiO_2$ | Silicon Dioxide |

With a stoichiometric ratio of the nitrogen oxide and the ammonia, the following reduction rates in percentages were obtained at the following temperatures:

| Temperature | Reduction Rate |
|---|---|
| 250° C. | 95% |
| 300° C. | 98% |
| 350° C. | 99% |
| 400° C. | 95% |

Both the above substances where mixed together, depending on the application, to produce the bricks. Different mixtures of the two substances were prepared which exhibited the following reduction rates, in percentages, in relation to the characteristic following proportions of chromium oxide at the following temperatures:

| | Temperature | | | | |
|---|---|---|---|---|---|
| % of $Cr_2O_3$ | 250° C. | 300° C. | 350° C. | 400° C. | 450° C. |
| 10 | 72% | 95% | 98% | 97% | 95% |
| 5 | 65% | 93% | 97% | 98% | 98% |
| 1 | 55% | 82% | 93% | 98% | 98% |

For brown coal combustion, in which exhaust gas temperatures between 250° C. and 350° C. occur after the gas is exhausted from the combustion chamber, depending on the operating time of the furnace, the load case and design, a proportion of chromium oxide ($Cr_2O_3$) is selected in the mixture to be between 5 percent by weight and 20 percent by weight.

For melting chamber firings, for ballast bituminous coal which is burned at high temperatures, the exhaust temperatures, depending on the operating time of the furnace, the load case and the design, are typically approximately 350° C. to 450° C. The chromium oxide portion is for this case then set to less than 1 percent by weight.

Dry firings for high-value coal generally have exhaust temperatures in the range of 320° C. to 420° C. In this case, a mixture of both substances, from Table A and Table B, is used, in which there is a chromium oxide proportion of between 1 percent by weight and 5 percent by weight.

The mixture of the two above-mentioned substances contains relatively little $Al_2O_3$, but more $SiO_2$. That means that the $AL_2O_3$ exhibits only a slight tendency toward sulfate formation under the influence of sulfur trioxide. The $SiO_2$ with acid bonding contributes to a solid support structure for the bricks. It can be shown that specifically acid bonds of the mixture of substances make possible the formation of especially porous and solid bricks. Thin-walled, robust bricks can thereby be manufactured simply and economically. The production can take place, for example, by casting with a subsequent tempering, or, with the addition of an auxiliary agent, by extrusion with subsequent tempering.

With the various combustions, depending on the coal charge, dusts occur with different compositions. Depending on the different composition of the dusts and their differing physical consistency, the tempering temperatures are between 300° C. and 600° C., and acids are added to produce the catalyst. Suitable acids are $H_2SO_4$, $HNO_3$, $H_3PO_4$, HCl, HF or similar acids. These also immunize the catalyst against poisoning.

In stripping installations, an acidity of approximately 20% is selected. For brown coal, an acidity of 6% has proven favorable. For bituminous coal, an acidity of approximately 4% is preferably selected. For ballast coal, operations are conducted with an acidity of 2%. For dry combustion for high-value coal, the acidity can be lower than any of the aforementioned percentages.

The various dusts differ in their grain size distribution, among other things. Thus, for example, for dusts from the above-mentioned melting chamber combustion, the average grain diameter is between 18 and 20 microns (1 micron=1 micro meter which is equal to $10^{-6}$ meters). The smallest grain sizes are as low as 1 micron. The grain spectrum ends at 90 microns with no grains to be expected above the size. To prevent dust of the average grain diameter from clogging up the macropores of the catalyst, the average pore diameter of the catalyst is designed so that it is smaller than the average grain diameter of the dust. Preferably, the average macropore diameter of the catalyst is between one fourth and three fourths of the average grain diameter of the dust. It has been shown to be favorable when the average macropore diameter of the catalyst is approximately half as large as the average grain diameter. In the example described above, the average macropore diameter of the catalyst is approximately 10 microns. That means that dust particles which are just a bit larger accumulate over the pores and prevent the penetration of the finest dust parties into the pores by filtering. If a thick filter layer has accumulated, then it is eroded away by the dust flowing through the catalyst. That prevents the fine dust particles from penetrating densely and tightly into the macropores of the catalyst, from which they could only be removed at the expense of a very severe erosion of the catalyst.

If the large-grain fraction of the dust is not sufficient to loosen the filter layer, the coarse portion of the dust can be artificially increased. This can be done, for example, by omitting the fine-grinding or by a controlled addition of coarse-grained material. Such coarse-grained material, for example, sand or coarse-grain fractions of available fines, which can be extracted from the electrostatic filter, is preferably added to the gases after the combustion chamber, but ahead of the catalyst.

The catalyst brick produced from the above-mentioned substances takes the form of a checker brick 1, the length, width and height of which are preferably always between 10 centimeters and 50 centimeters.

In the checker brick 1, between webs 2, there are passages 3. The web thickness and the passage cross section are designed as a function of the gas throughput and the dust content. For a relatively low dust load of 20 milligrams to 350 milligrams dust/m$^3$ of gas, a low web thickness of 2 millimeters to 3 millimeters is selected, and a small passage cross section, from web to web, of 8 millimeters to 10 millimeters square. Average passage cross sections, from the inside of one web to its opposite web, of 10 to 15 millimeters square, with a correspondingly larger web thickness, are selected for a dust throughput of 350 milligrams to 25,000 milligrams of dust/m$^3$ of gas. Large passage cross sections, from web to web, of 10 to 20 millimeters square, with correspondingly larger web thicknesses, are selected for dust concentrations of 25,000 to 50,000 milligrams of dust/m$^3$ of gas.

Figure 2:
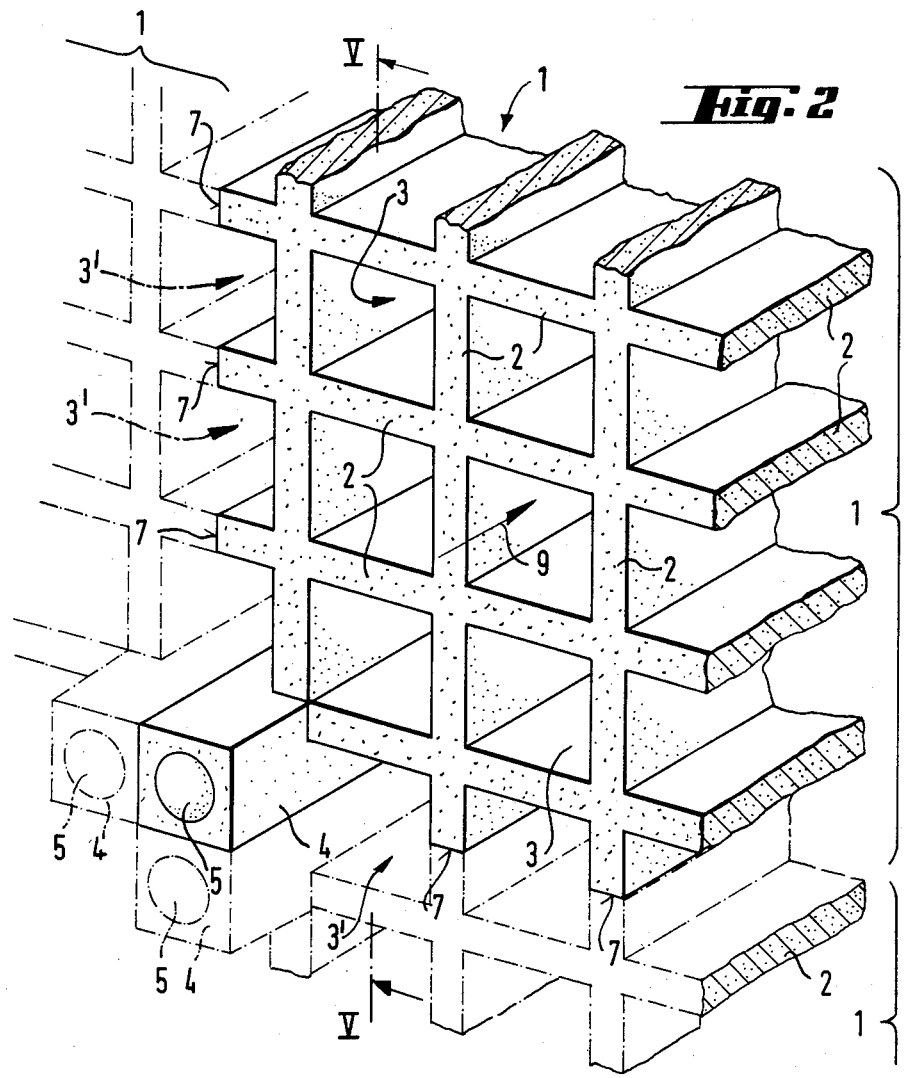
FIG. 2 shows an enlarged perspective view of a corner region of the brick illustrated in FIG. 1.
Figure 4:
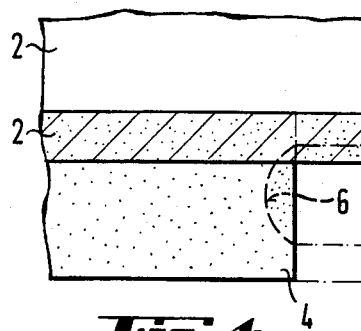
FIG. 4 shows a side view of the other end of a leg of the brick.
Figure 3:
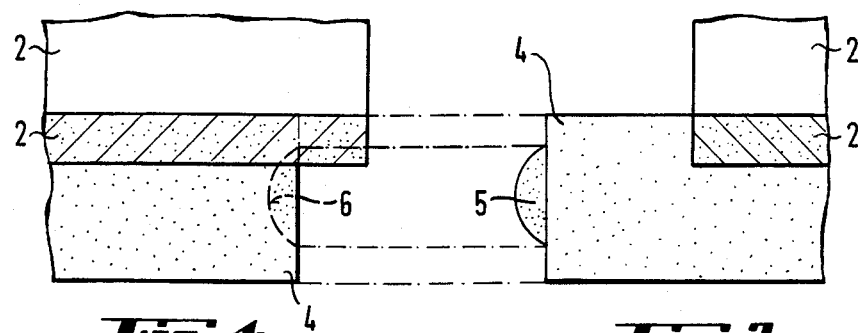
FIG. 3 shows a side view of one end of a leg of the brick.
Figure 5:
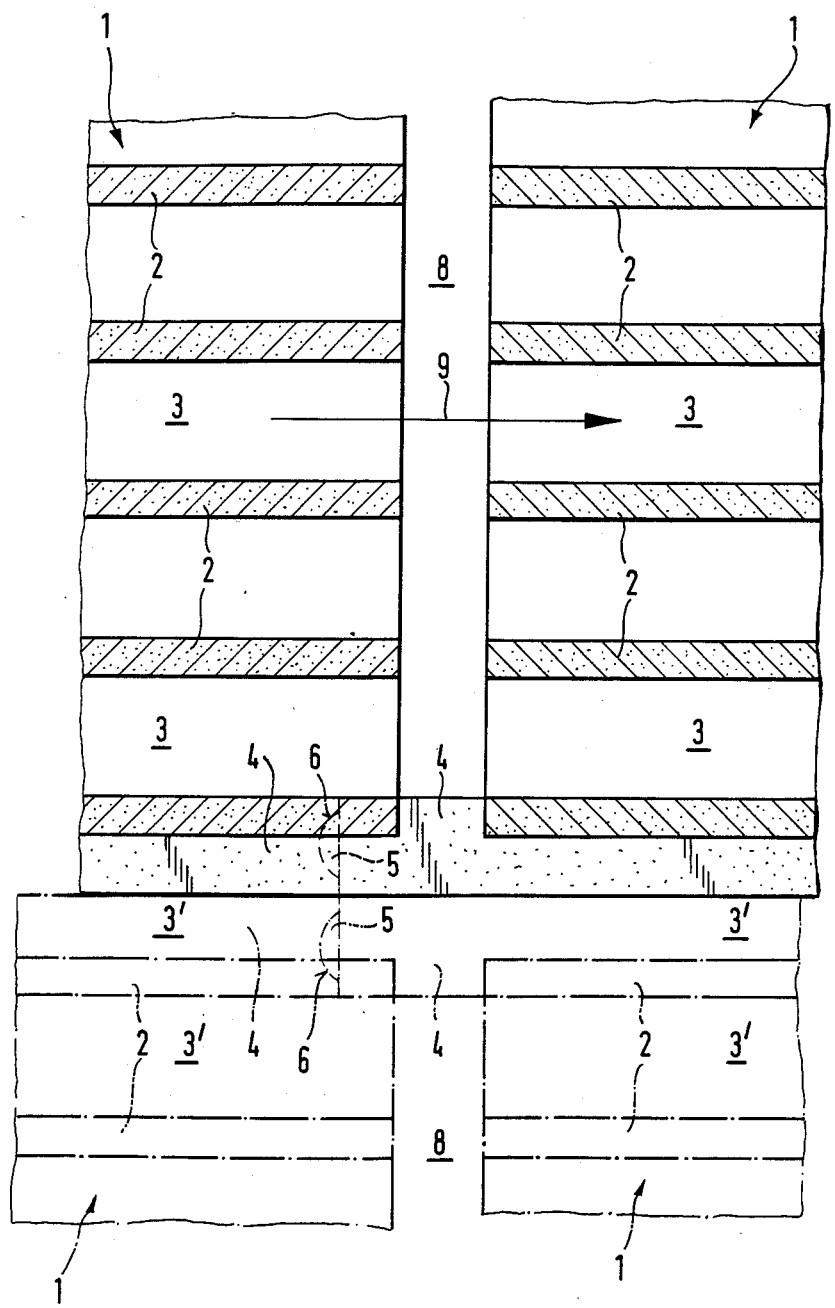
FIG. 5 shows a detailed cross-sectional view as seen from one side, through two catalyst bricks which are disposed adjacent one another.

The checker brick 1 has, at its corners, legs 4 which project beyond the webs 2, as shown in FIGS. 2 and 5. The legs 4 project out from the webs 2, either at both end surfaces, at which the passages 3 are open, or only on one end surface. On one end of each leg 4, there is a centering projection 5. A corresponding recess 6, to receive the projection 5, is found on the other end of each leg 4.

The webs 2, which extend from an outer surface of the checker brick 1, form contact surfaces 7 on the outside of the checker brick 1, which lie in the alignment of the legs 4. If checker bricks 1 are set close to one another, passages 3' are also formed between neighboring checker bricks.

To construct the catalyst, the checker bricks 1 are placed close to one another (see FIGS. 2 and 5). On the layer of checker bricks thus formed, several more layers or sections of checker bricks are laid, whereby the centering projections 5 of the checker bricks 1 in one layer fit into the recesses 6 of the legs 4 of the checker bricks of the next layer. Spaces are thereby formed between the webs 2 of the checker brick layers, which are determined by the length of the legs 4. The legs 4 are designed so that the distance between the layers is between 5 millimeters and 100 millimeters. As a result of this structure, penetration openings 8 are formed between the layers of checker bricks transverse to the direction of flow in the passages 3 as shown by an arrow 9.

In practice, it is to be expected that different pressures will build up in the passages 3, either because of manufacturing tolerances or because of different amounts of dust deposited in the passages 3. The penetration openings 8 transverse to the direction of flow in the passages 3 cause a pressure equilization after each layer or column of bricks. These penetration openings 8 are preferably between about 0.5 centimeters and about 10 centimeters wide. As a result of this pressure equalization, the gas and dust quantities flowing through the passages 3 receive a flow component transverse to the direction of flow as shown by the arrow 9 in the aligned passages 3 of the layers of checker bricks. Especially large dust particles thereby have been formed to be diverted by an acute angle, of between 10° and 30°, toward the walls of the catalyst. The result is that dust fines adhering to the surface of the catalyst and closing the pores are eroded away by the coarser dust. If, for example, chloride or sulfate formations have accumulated, causing inactive surfaces and surfaces having decaying activity on the catalyst, then these surface areas are worn away by the coarse dust. It has been shown that the depth of a catalyst layer which has become inactive is approximately 0.002 millimeters, so that it can be easily worn away by the dust flowing through the passages 3. After the erosion of the catalyst surface, there is always fresh catalyst surface available until the catalyst is completely worn away. The catalyst therefore exhibits a self-cleaning action when exposed to dust.

In an alternative embodiment of the invention, the dust in the exhaust gas has an average grain diameter, and the at least one porous surface of the catalytic ceramic structure has pores having an average diameter. The average pore diameter of the at least one porous surface of the catalytic ceramic structure is between about ¼ and about ⅜ of the average grain diameter of the dust.

In yet another alternative embodiment of the invention, this average pore diameter of the at least one porous surface is ½ of the average grain diameter of the dust.

The catalyst erosion is conducted with the dust for use as flue dust. Worn checker bricks can be rpelaced and easily disposed of in a blast furnace.

It has been shown that a daily cleaning of the passages is sometimes sufficient by blowing with outside agents, such as steam or air. During the cleaning, care is to be taken that excess pressure does not drive the dust fines into the pores of the catalyst. The penetration of liquid or condensation phenomena in the catalyst should be avoided, since the dust fines then tend to cause cementation.

In the context of the invention, there are numerous other embodiments. Thus, for example, the cross section of the passages can also be web-shaped or round. Care is to be taken that the length of the passages is not so long that the deflection of the coarse dust caused by the pressure equalization between the checker bricks does not cause any significantly oblique dust contact with the surface of the catalyst. The layer of checker bricks which is closest to the entrance of the exhaust gas containing the dust, is exposed to particularly severe wear. To prevent premature wear, checker bricks should be used there which have been acid-treated for a hardness which is greater than the checker bricks of the other layers.

The invention as described hereinabove in the context of the preferred embodiment is not to be taken as limited to all of the provided details thereof, since modifications and variations thereof may be made without departing from the spirit and scope of the invention.

What is claimed is:

1. A catalytic ceramic material structure, of at least one brick, for use with a reagent for removal of at least one ciontaminant from an exhaust gas of combustion having a known dust content entrained therein, said catalytic ceramic structure comprising:
   at least one porous surface for being impinged upon by said exhaust gas and being fouled in use by action of said exhaust gas flowing thereby;
   said ceramic structure having at least one passage therein for conducting said exhaust gas by said at least one porous surface;
   said catalytic ceramic material being formulated from components selected with regard to said dust content of said exhaust gas, to provide said catalytic ceramic material with a wear characteristic to abrasion by said dust entrained in said exhaust gas thereby reactivating said catalytic action of said catalytic ceramic material, by wearing away at said at least one porous surface being fouled in use, at a rate related to said wear characteristic to abrasion of said catalytic ceramic material and said dust content of said exhaust gas, whereby said abrasion of said at least one surface of said catalytic ceramic material proceeds at a given rate in use, and further whereby material abraded from said at least one surface of said catalytic ceramic material is carried away by said exhaust gas, whereby fresh catalyst surface is continuously exposed to said exhaust gas.

2. The catalytic ceramic structure according to claim 1 wherein said at least one passage comprises passages in said at least one brick, said passages having said at least one porous surface of said catalytic ceramic structure, each said passage having at least one wall containing at least one porous surface for said catalytic action, each said passage having a longitudinal axis, said passages extending through said structure along each said longitudinal axis for conducting said exhaust gas therethrough along a general direction of flow.

3. The catalytic ceramic structure according to claim 2 wherein said at least one brick comprises a plurality of bricks including penetrating openings between said bricks of said structure, said penetrating openings being disposed transverse to said longitudinal axis of said passages.

4. The catalytic ceramic structure according to claim 3 wherein said passages have lengths between said transversely disposed penetrating openings, and wherein said penetrating openings have heights;
   said heights of said transverse penetrating openings and said lengths of said passages being mutually in a ratio to create, during use, said flow of gas and dust through said passages for impinging upon said at least one passage wall at an angle of between about 10° and about 30° with respect so said at least one passage wall.

5. The catalytic ceramic structure according to claim 2 including extensions from said bricks, wherein said transverse penetrating openings are formed by contact between said bricks and said extensions from said bricks.

6. The catalytic ceramic structure according to claim 5 including centering projections disposed at one end of said extensions from said bricks, and wherein said bricks have corresponding depressions at another end of said extensions from said bricks, said depressions for receiving said projections from adjoining ones of said bricks.

7. The catalytic ceramic structure according to claim 6 wherein each of said bricks has webs around and between said passages therein; a portion of said webs being disposed on an outer portion of said bricks and projecting therefrom, said portion of said webs being disposed parallel to said longitudinal axis of said bricks, said portion of said webs projecting from said bricks being elongated.

8. The catalytic ceramic structure according to claim 7 wherein said bricks are between about 10 centimeters and about 50 centimeters long.

9. The catalytic ceramic structure according to claim 8 wherein said transverse penetrating openings are between about 0.5 centimeters and about 10 centimeters.

10. The catalytic ceramic structure according to claim 1 wherein said dust in said exhaust gas has an average grain diameter, and wherein said at least one porous surface has pores having an average diameter, and wherein said average pore diameter of said at least one porous surface is between about $\frac{1}{4}$ and about $\frac{1}{3}$ of said average grain diameter of said dust.

11. The catalytic ceramic structure according to claim 10 wherein said average pore diameter of said at least one porous surface is $\frac{1}{2}$ of said average grain diameter of said dust.

12. The catalytic ceramic structure according to claim 1 wherein said structure includes means for directing a flow of said exhaust gas to impinge upon said at least one at least one porous surface of said catalytic ceramic structure, whereby said at least one surface is abraded away during use.

13. A catalytic ceramic material structure, of at least one brick, for use with ammonia for removal of oxides of nitrogen from an exhaust gas of combustion having a known dust content entrained therein, said catalytic ceramic structure comprising:
   at least one porous surface for being impinged upon by said exhaust gas and being fouled in use by action of said exhaust gas flowing thereby;
   said ceramic structure having at least one passage therein for conducting said exhaust gas by said at least one porous surface;
   said catalytic ceramic material being formulated from components selected with regard to said dust content of said exhaust gas, to provide said catalytic ceramic material with a wear characteristic to abrasion by said dust entrained in said exhaust gas for wearing away, at a given rate, at said at least one porous surface being fouled and for continuously exposing fresh catalyst to said exhaust gas.

14. The catalytic ceramic structure according to claim 13 wherein said at least one passage comprises passages in said at least one brick, said passages having said at least one porous surface of said catalytic ceramic structure, each said passage having at least one wall containing at least one porous surface for said catalytic action, each said passage having a longitudinal axis, said passages extending through said structure along each said longitudinal axis for conducting said exhaust gas therethrough along a general direction of flow.

15. The catalytic ceramic structure according to claim 14 wherein said at least one brick comprises a plurality of bricks, including penetrating openings between said bricks of said structure, said penetrating openings being disposed transverse to said longitudinal axis of said passages.

16. The catalytic ceramic structure according to claim 15 wherein said passages have lengths between said transversely disposed penetrating openings, and wherein said penetrating openings have heights;

said heights of said transverse penetrating openings and said lengths of said passages being mutually in a ratio to create, during use, said flow of gas and dust through said passages for impinging upon said at least one passage wall at an angle of between about 10° and about 30° with respect so said at least one passage wall.

17. The catalytic ceramic structure according to claim 14 including extensions from said bricks, wherein said transverse penetrating openings are formed by contact between said bricks and said extensions from said bricks.

18. The catalytic ceramic structure according to claim 17 including centering projections disposed at one end of said extensions from said bricks, and wherein said bricks have corresponding depressions at another end of said extensions from said bricks, said depressions for receiving said projections from adjoining ones of said bricks.

19. The catalytic ceramic structure according to claim 18 wherein each of said bricks has webs around and between said passages therein; a portion of said webs being disposed on an outer portion of said bricks and projecting therefrom, said portion of said webs being disposed parallel to said longitudinal axis of said bricks, said portion of said webs projecting from said bricks being elongated.

* * * * *